Jan. 31, 1967  G. J. SHELDON  3,301,648
METHOD OF CONFINING AND SURFACING END PORTIONS OF OPTICAL
FIBER BUNDLES FOR MAXIMUM LIGHT TRANSMISSION
Filed July 1, 1963  2 Sheets-Sheet 1

GILBERT J. SHELDON
INVENTOR

BY

ATTORNEYS

Jan. 31, 1967 G. J. SHELDON 3,301,648
METHOD OF CONFINING AND SURFACING END PORTIONS OF OPTICAL
FIBER BUNDLES FOR MAXIMUM LIGHT TRANSMISSION
Filed July 1, 1963 2 Sheets-Sheet 2

GILBERT J. SHELDON
INVENTOR

BY

ATTORNEYS

United States Patent Office 3,301,648
Patented Jan. 31, 1967

3,301,648
METHOD OF CONFINING AND SURFACING END PORTIONS OF OPTICAL FIBER BUNDLES FOR MAXIMUM LIGHT TRANSMISSION
Gilbert J. Sheldon, Irondequoit, N.Y., assignor to Bausch & Lomb Incorporated, Rochester, N.Y., a corporation of New York
Filed July 1, 1963, Ser. No. 292,036
4 Claims. (Cl. 65—4)

This invention relates to processing fiber bundles and more particularly to a method of confining and surfacing the end portions of a fiber bundle for maximum light transmission.

During the manufacturing of a fiber bundle, it is necessary that the fibers within the bundle be retained in a fixed position relative to each other. Although some degree of movement of the fibers is permissible for a light carrying fiber bundle it still is necessary that all the fibers be maintained in the form of a bundle at least at their end portions. While being retained in this position a permanent bonding or retaining means must be fixed on the end of the bundle to prevent any movement of the fibers once the end surface is formed on the end of the bundle.

Accordingly this invention is intended to provide a method of retaining the position of the fibers in the end portion of the bundles and then permanently fixing the relative position of each of the plurality of fibers in the bundle and forming an end surface producing maximum efficiency of light transmission to or from the bundle.

It is an object of this invention to provide a permanent retaining means fixing the relative position of at least a portion of each of a plurality of fibers and simultaneously surfacing the end surface of the bundle.

It is another object of this invention to permanently fix the ends of light transmitting fibers in a group and provide a light transmitting end surface of suitable light transmititng quality.

It is a further object of this invention to temporarily hold the end portion of each of a plurality of fibers while permanently bonding them in this position and then provide an end surface of the desired light transmitting quality.

It is a further object of this invention to retain a plurality of fibers within peripheral limits and permanently fix their relative position to each other and provide a suitable light transmitting means on the end surfaces to provide the desired light transmission to or from the bundle.

The objects of this invention are accomplished through three basic steps which include variations within these basic steps. Subsequent to the grouping, or winding of a plurality of fibers in bundles to form a light transmitting means, it is necessary to maintain a fixed relationship on the end portions of each of the bundles. A retainer means of any sutiable nature may be used or a cementing means on the engaging lateral surfaces of the plurality of fibers. It is desirable to confine the fibers to a maximum fiber density for a given cross sectional area.

While the fibers are being retained in a temporary fixed position a permanent bonding or retaining means is then applied to the end portion of the bundle to permanently fix the relative position of each of the fibers forming the bundle. Simultaneously with the permanent bonding of the plurality of fibers, or subsequently to this step a surfacing step is applied to the bundle providing a light transmitting end surface of the desired efficiency needed for any future use of the bundle. The surfacing may be any of a plurality of types of which grinding, and polishing, replicating, or fixing an optical element on the end of the bundle are examples.

The invention will become apparent from the following detailed description and the accompanying drawings which set forth the preferred embodiments of this invention.

The drawings illustrate generally the process for holding the bundle temporarily while a bonding agent or confining means is placed on the end portion of the bundle and the desired surface for transmission of light is formed. The various views illustrate a variety of ways in which these basic steps may be accomplished. The fibers in the bundle must be temporarily held while permanently fixing each of the fibers in a predetermined relative position relative to each other and while in this position the desired light transmitting surface is formed on the end surface of the bundle. The invention does not limit its scope to any specific type of surface but primarily to the formation of a surface which adapts itself to efficient light transmission to or from the bundle.

Figure 1:
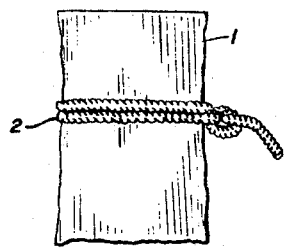
FIG. 1 illustrates a manner of temporarily retaining a bundle of fibers within a limited periphery.
Figure 2:
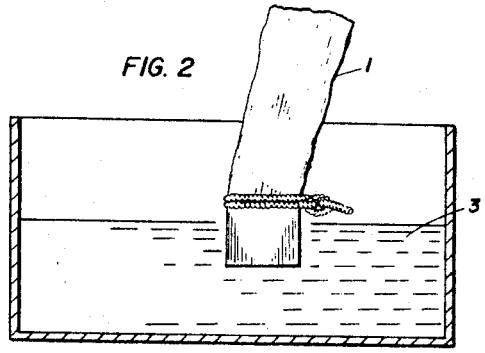
FIG. 2 illustrates the dipping of the end of the bundle in a liquid to initiate setting of the fibers.

Referring to FIG. 1 the end of the bundle 1 is temporarily retained within confined limits by a cord 2. FIG. 2 illustrates the bundle 1 held together by the cord 2 with the end portion being dipped in a body of any cohesive liquid agent. The agent should have a wetting property to wet all the fibers. Water for example, has been used satisfactorily.

Upon removal from the liquid a temporary bonding and combing action is initiated which tends to align the fibers in parallel relationship and draw them closely together in such a manner that the maximum fiber density is achieved.

During the final stages of evaporation of the liquid forces are established among the fibers probaly due to the formation of van der Waal's bond. This produces a fixation of the fibers which is sufficient for temporary holding of the fibers and permitting removal of the cord until a permanent bond is provided.

Figure 3:
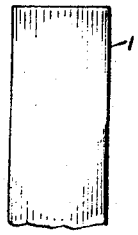
FIG. 3 illustrates the bundle of fibers which are wet shrunk and fixed in this position by molecular bonding as the fibers dry.

This first step as illustrated in FIGS. 1, 2 and 3 provides an economical and efficient way of obtaining a desirable parallel relationship of fibers for reducing to a minimum cross sectional area of the interstices intermediate each of the engaging fibers. A bundle of this type adapts itself very well to the function of a light carrier where there is no necessity for a coherent relationship of each fiber on the entrant and exit end of the bundle which is required of all image transmitting bundles.

Figure 4:
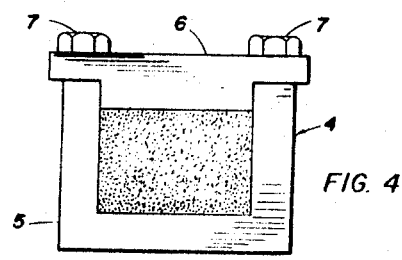
FIG. 4 illustrates a clamping means whereby coherent bundles of fibers are retained in a fixed relative position.

FIG. 4 illustrates a claim 4 in which plural layers of parallel aligned fibers are placed for image transmission. The specific orientation of fibers must be maintained in the entrant end and the exit end in order that an image be transmited through the fibers. The orientation may be maintained throughout the length of the bundle, however, to permit flexibility of the bundle the portion intermediate the ends of the bundles are usually permitted to flex at will. The clamp 4 consists of the U-shaped lower jaw 5 and the plate 6 forming the upper jaw. The plurality of bolts 7 are tightened to firmly seat the plate 6 on the upper surface of the bundle as illustrated. With the tightening of the clamp each of the plurality of fibers within the clamp are firmly fixed to eliminate any shifting or any end portion within the clamped area. The clamped fibers are then ready for impregnation of a bonding agent as subsequently illustrated and described.

Figure 5:
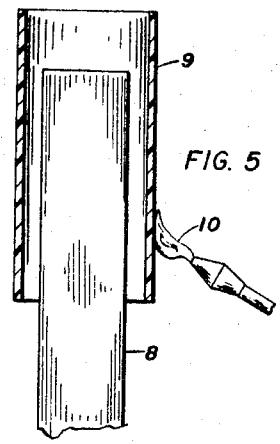
FIG. 5 illustrates a method of shrinking a plasticized tube about the outer periphery of the end portion of the bundle.
Figure 6:
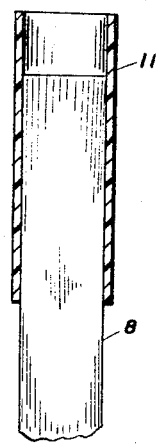
FIG. 6 illustrates the tube shrunk on the outer periphery of the bundle.

Referring to FIG. 5 a group of fibers 8 are received within the plastic tube 9. The plastic tube 9 is formed of a resinous material which is thermoplastic throughout a range of temperatures and is elastic in nature. The material exists in two primary states which may be referred to as heat stable and heat unstable. The heat stable condition being where the resin has released all its internal elastic forces and is in a state of equilibrium. Under this condition the resin will not alter its physical form upon application of heat.

The heat unstable condition is present when the elastic forces are not released and the material is not in a state of equilibrium. The material contains elastic forces within itself and is merely held in its present shape due to the rigidity of the material at the temperature of the material. From this heat unstable condition the resin will upon application of heat above its heat distortion point tend to change its physical form to the heat stable condition. Upon application of heat the plasticity becomes so great that the material approaches fluidity allowing it to distort or flow to its original heat stable form.

FIG. 5 illustrates the sleeve 9 in a heat unstable form. Upon application of heat by the flame 10 the sleeve becomes deformable and semi-fluid and the internal stresses cause the tube to shrink to its original heat stable form as illustrated by the sleeve 11 which is shrunk about the outer periphery of the group of fibers 8. The shrinking action of the tube is sufficient to restrict the bundle to a very confined area and thereby permanantly hold the fibers in this position. For some purposes the sleeve provides a sufficient permanent holding force for the fibers. If desirable a bonding agent may be subsequently applied to the fibers on the end portion of the bundle. This is illustrated in subsequent steps.

The shrinking of a material might be accomplished in a variety of ways which may not merely change the physical shape due to internal stresses inherent in the plastic, but using compositions of material in which a chemical reaction is triggered by triggering means. The applicant is primarily concerned with a means for confining the fibers to a minimum cross sectional area to obtain the greatest number of fibers wtihin the sleeve and the smallest space intermediate the fibers.

Figure 7:
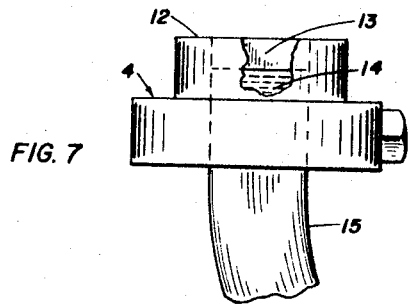
FIG. 7 illustrates a means for impregnating the interstices intermediate the fibers of the bundle.

FIG. 7 illustrates the bundle of fibers similar to that illustrated in FIG. 4 wherein a reservoir 12 is placed on top of the clamp 4 to form a chamber 13. A suitable bonding agent 14 such as an epoxy resin is then placed within the reservoir chamber 13. Epoxy resins have sufficient cohesive action and surface tension to cause a capillary action drawing the fluid into the interstices intermediate the fibers of the bundle 15. During the period that the epoxy resin is catalyzed and the epoxy resin is in the liquid state the resin flows into the end portion of the bundle 15 and forms a permanent bonding agent. Subsequent to setting of the epoxy resin the clamp 4 may be removed and the bundle will retain its position as bonded.

Figure 8:
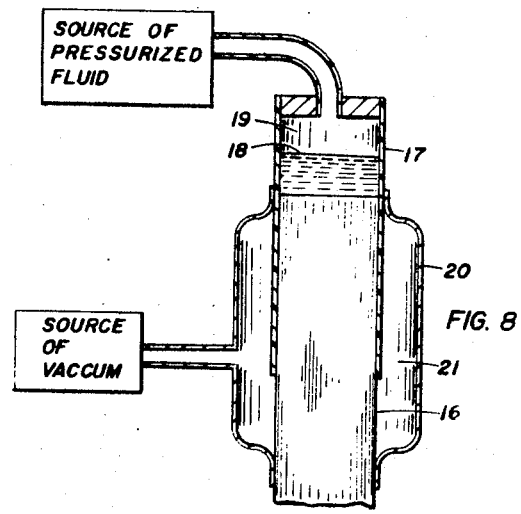
FIG. 8 illustrates a means of applying a source of pressure on the bonding agent while in liquid form and a source of vacuum which draw the bonding agent into the end of the bundle.

FIG. 8 illustrates a similar means for applying the permanent bonding agent to the end of the bundle 16. A shrink tube 17 is placed on the end of the bundle 16 and shrunk in position. The bonding agent 18 is then placed within the chamber 19 in the top end of the tube 17. A source of pressurized fluid is then applied within the chamber 19 to force the bonding agent 18 into the end of the bundle of fibers. To stimulate the movement of the bonding agent 18 a second sleeve 20 which is firmly sealed on both ends and forms a chamber 21 which is in communication with a source of vacuum. The differential of pressure between the chambers 21 and 19 causes a movement of the bonding agent as it is in its fluid state to migrate into the end of the bundle 16. This type of an applicator for the bonding agent may be used in event that the bonding agent is somewhat viscous as it is being applied. It is also useful where the capillary action is not sufficient to adequately cause the bonding agent to flow a sufficient distance into the end of the bundle prior to setting and bonding of the fibers. Various means might be devised to provide a differential of pressure for forcing the bonding agent into the end of the bundle.

Figure 9:
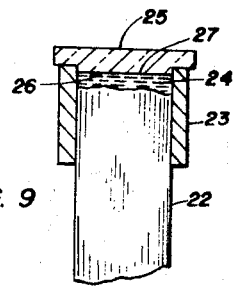
FIG. 9 illustrates a means of replicating a surface on the bonding agent forming the end of the bundle.

FIG. 9 illustrates a bundle of fibers 22 supporting a mold 23 forming a chamber for bonding agent 24. The upper end of the mold 23 receives a replicating element 25 which has a smooth surface 26 suitable for replication of the end surface 27 of the bundle 22. Subsequent to bonding of the upper end of the bundle and replicating of the surface 27 on the bundle, the mold 23 and the replicating element 25 are removed. This provides a very rapid way of forming a light transmitting surface 27 on the end of a bundle.

Figure 10:
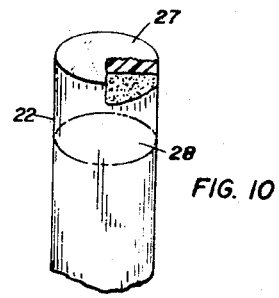
FIG. 10 illustrates a replicated surface and the approximate location for grinding a surface if preferred, on the bundle of fibers.

If the bundle of fibers 22 have uneven surfaces on their ends which is often caused during severing of the bundle from the winding drum, then the bonding agent 24 used should have the same refractive index as the material in the fibers of bundle 22. The light transmitted through the fibers then passes through the bonding agent 24 which operates as a light transmitting medium. The efficiency of transmission is not as high as if the end surfaces were formed by a grinding and polishing operation. The grinding and polishing operation is more expensive and the use of the bundle may not warrant the additional expenditure of this type of operation. Replicating a surface 27 as illustrated in FIGS. 9 and 10 requires that the surface 26 of the replicating element 25 be an optical surface of a predetermined degree of smoothness and limited irregularity. Polyethylene terephthalate resin (Mylar) or glass with a parting agent such as silicone will separate from the replicated surface when the replicating material has set.

Figure 11:
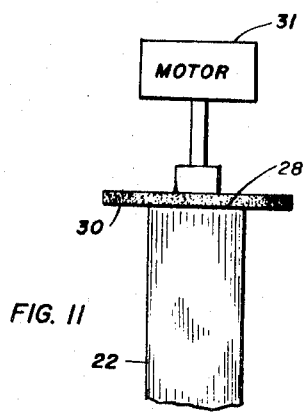
FIG. 11 illustrates a means for grinding and polishing the end surfaces of a bundle.

FIG. 11 illustrates a method of grinding an end surface of a bundle 22 so that the ends of each of the ends of fibers in the end of the bundle are ground on a common plane 30. This common plane is then polished by a similar polishing wheel operated by a suitable driving means 31. The surface 30 illustrated in FIG. 11 is a planar surface although the surface generated may be any suitable surface of a predetermined degree of smoothness.

Figure 12:
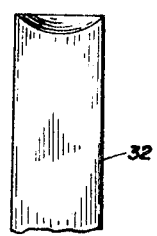
FIG. 12 illustrates a concave surface which may be ground on the end of the bundle by a suitable grinding wheel.

FIG. 12 illustrates a concave surface which may be generated in the manner as illustrated in FIG. 11, or FIG. 9 and adapts itself readily for use with an optical system.

Figure 13:
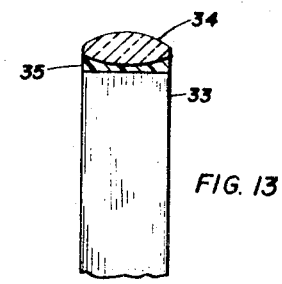
FIG. 13 illustrates a lens bonded on the end of the bundle to control the direction of the light transmitted to or from the bundle.

FIG. 13 illustrates a bundle 33 cemented to a lens element 34 by a bonding agent 35. The bonding agent 35 operates as a light transmitting agent as well as a bonding agent between the lens element 34 and the bundle 33. The bonding agent 35 is also impregnated in the interstices on the end of the bundle 33. The full end portion of the bundle 33 is bonded and the end surface has an optical element fixed thereto for providing efficient light transmitting quality as well as image transmitting quality. It is understood that to provide good image transmitting quality the bundle itself must be formed in a coherent manner so that all fibers have the proper orientation on their entrant and exit ends.

Referring to FIG. 7 this type of a bundle is illustrated which could be processed in the manner as illustrated in FIGS. 12 and 13 to provide the desired image transmitting qualities necessary with a coherent bundle of this type. Placing an optical element on the bonding agent 14 of FIG. 7 would provide the bundle illustrated in FIG. 13.

The process will be described in the following paragraphs. The first of the generic steps is the holding of the end portion of a bundle of fibers while permanently bonding of the end portion of the bundle. This holding operation is illustrated in FIG. 4 in which a clamp is used to retain the fibers in a predetermined alignment and orientation necessary for image transmission. This relationship is fixed by the clamp until a permanent bonding is accomplished in a subsequent step.

A modification of this initial holding of the fibers in a predetermined position is shown in FIGS. 1, 2 and 3 wherein a confining means such as a cord is positioned around the bundle until the drawing action intermediate the fibers of the bundle is caused by dipping the bundle in a liquid to align the fibers in a parallel relationship and through an attracting and holding force, the fibers cling together to form a temporary bonding of the fibers. This temporary bonding is sufficient in itself to hold the end portion while a more permanent holding means is provided. The second modification of the initial holding step is illustrated by a shrink tube which may be shrunk by same triggering operation such as heat causing internal forces within the sleeve to be released as the plastic becomes semifluid and the internal forces in the plastic deformed physical shape. The sleeve is shrunk firmly around the outer periphery of the bundle to firmly hold the plurality of fibers on the end portion of the bundle in an engaging position. The confining force of the sleeve is sufficient for permanently fixing the fibers in some instances and could be considered the second step in the process under these circumstances.

The second generic step of the process is the permanent fixing of the fibers in the bundle and may also be accomplished as illustrated in FIGS. 7 and 8. The bonding agent may be any suitable bonding material which has a lower melting point than the glass or other opitical fiber material. An epoxy resin adapts itself well to this type of bonding in that its temperature of fluidity is low and due to capillary action the resin impregnates itself intermediate the fibers in the end of the bundle. When a sufficient time has lapsed the epoxy resin will set and permanently bond the fibers in the fixed relationship in accordance with the relationship maintained by the initial confining means.

Certain types of glass having low melting temperatures even though somewhat more viscous than an epoxy resin can be used as a bonding agent. The reason for use of this type of bonding agent is that the agent cements itself more readily to the peripheral surfaces of the fiber and also the bonding agent subsequent to fixing itself to the fiber is more rigid. This provides a more suitable bonding agent as it fixes the fibers more rigidly relative to each other. This is particularly advantageous where a subsequent surfacing operation is performed on the ends of the fibers as there is no movement of the fibers caused by the abrasive on the end surfaces of the fiber.

The third generic step of this process is illustrated in FIGS. 9, 10, 11, 12 and 13. FIG. 9 sets forth a replicating process wherein the end portion of the bundle of fibers is bonded simultaneously with forming of the replicated surface on the end of the bundle of fibers. If the bonding agent is pervious to light and has a like index of refraction to that of the fibers the light rays are not refracted. This provides an inexpensive means of bonding and surfacing an end of the bundle of fibers to provide maximum efficiency of light transmission for a minimum of cost. Where a greater fidelity of image transmission is desired, a grinding and polishing operation which grinds each of the plurality of fibers back beyond the original point of severing the bundle is needed. FIG. 11 illustrates a surface where the end surfaces of each of the fibers forms a part of a composite surface which has the desired curvature, or linearity necessary for image transmission. A suitable surface is generated on the ends of the bundle to give the desired image input and output to the bundle.

In FIG. 13 an optical element is fixed to the end of the bundle which is adapted for use in an optical system. Whether an optical element be fixed to the bundle or in spaced relation to the end of a surface on a bundle is dictated by the optical system and the space requirements inherent with the use of the bundle.

The surfacing of the bundle may be done simultaneously with the bonding, or subsequent to the bonding of a bundle. It is conceivable that a bonding agent per se might be eliminated where a sufficiently rigid retainer means is provided and the surfacing may be done after the retainer means fixes the relationship of the plurality of fibers. This situation would more likely exist when the bundle is used for merely a light transmitting medium and the coherency of the input and the output portions of the bundle are not needed as is the case for image transmission.

The preferred embodiments of this invention have been illustrated and described and it is understood that modifications might be devised which would fall within the scope of the invention which are covered by the attached claims.

I claim:
1. A method for producing light-transmitting fiber apparatus having a portion with a molded refractive surface including the steps of
   aligning multiple light-transmitting fibers along parallel axes to form a compact flexible bundle having fiber ends terminating at a surface transverse to the bundle axes, and
   molding light-transmitting bonding agent between the fiber ends and an optical surface whereby the optical surface is replicated by the molded light-transmitting bonding agent to produce a refractive surface transverse to the bundle axes.

2. The method of claim 1 wherein the molded light-transmitting bonding agent has a refractive index substantially the same as that of the fibers.

3. The method of claim 1 wherein the light-transmitting bonding agent is introduced into interstices between the fibers by flowing the light-transmitting bonding agent in liquid state and solidifying the bonding agent in place to bond the fibers permanently and to provide a replicated optical surface adjacent the terminal portions of the fibers.

4. In the method for manufacturing a light-transmitting fiber bundle having a plurality of light-transmitting fibers aligned along parallel axes wherein the fiber bundle is severed to form an end portion, the improvement which comprises molding a light-transmitting bonding agent between the fiber bundle end portion and a smooth surface to replicate the smooth surface in the molded bonding agent.

References Cited by the Examiner
UNITED STATES PATENTS

| | | | |
|---|---|---|---|
| 2,311,704 | 2/1943 | Simison | 156—296 X |
| 2,694,661 | 11/1954 | Meyer. | |
| 2,752,731 | 7/1956 | Altosaar | 65—4 X |
| 2,802,764 | 8/1957 | Slayter et al. | 156—84 |
| 2,992,956 | 7/1961 | Bazinet. | |
| 3,033,731 | 5/1962 | Cole | 65—4 X |
| 3,084,088 | 4/1963 | Hunkeler | 117—61 X |
| 3,093,448 | 6/1963 | Kirkpatrick et al. | |
| 3,119,678 | 1/1964 | Bazinet | 156—296 X |
| 3,148,967 | 9/1964 | Hicks | 156—296 X |

EARL M. BERGERT, *Primary Examiner.*

P. DIER, *Assistant Examiner.*